United States Patent
Montalan et al.

[11] Patent Number: 5,490,049
[45] Date of Patent: Feb. 6, 1996

[54] LED SIGNALLING LIGHT

[75] Inventors: Dominique Montalan, Paris; Dominique Durand, Yzeure; Stéphane Vin, Sens; Jean-Claude Gasquet, Saint-Clement, all of France

[73] Assignee: Valeo Vision, Bobigny, France

[21] Appl. No.: 271,197

[22] Filed: Jul. 7, 1994

[30] Foreign Application Priority Data

Jul. 7, 1993 [FR] France .................. 93 08338

[51] Int. Cl.⁶ .................. F21V 11/00
[52] U.S. Cl. .................. 362/240; 362/241; 362/245; 362/329; 362/800; 362/80
[58] Field of Search .................. 362/61, 80, 240, 362/241, 245, 328, 329, 309, 331, 800, 247

[56] References Cited

U.S. PATENT DOCUMENTS 4,345,308  8/1982  Mouyard et al. .................. 362/245 X
4,733,335  3/1988  Serizawa et al. .................. 362/80

FOREIGN PATENT DOCUMENTS 0326668  8/1989  European Pat. Off. .
0362993  4/1990  European Pat. Off. .
4128995  3/1993  Germany .

*Primary Examiner*—Stephen F. Husar
*Attorney, Agent, or Firm*—McCormick, Paulding & Huber

[57] ABSTRACT

A signalling light for a motor vehicle having a plurality of individual light-emitting diodes co-operating with optical arrangements, a common inner plate, a common outer plate, and closure cover situated outside the outer plate. The signalling light further having a plurality of elongate printed circuits on which the respective light-emitting diodes are mounted and wherein the inner plate has means for mounting the printed circuits parallel to one another to provide for a block of signalling lights.

18 Claims, 4 Drawing Sheets

LED SIGNALLING LIGHT

The present invention relates in general to the signalling lights of motor vehicles, and more particularly to a signalling light of the type comprising a plurality of individual light sources in the form of light-emitting diodes (LEDs) co-operating with optical arrangements.

BACKGROUND OF THE INVENTION

Such a light is already known in the art. Nevertheless, it requires a large number of light sources to be mounted on supports, and a corresponding number of optical arrangements to be mounted, each disposed over a corresponding source so as to obtain required photometric characteristics.

It will be understood that such assembly is lengthy and fiddly and that the cost price of the resulting light is high.

The present invention seeks in particular to simplify the design and the assembly of such a signalling light.

U.S. Pat. No. 4,733,335 discloses a signalling light for a motor vehicle, the light comprising:

a plurality of individual light-emitting diode light sources co-operating with optical arrangements;

a common inner plate having a set of outwardly-flaring cavities and having openings at their small ends through which respective LEDs emit light;

a common outer plate disposed substantially against the outside face of said inner plate and including an optical arrangement over each cavity for processing the light from the corresponding LED; and a closure cover situated outside the outer plate.

Such a known light nevertheless suffers from a certain number of drawbacks:

it is fiddly to assemble insofar as all of the LEDs are soldered successively to a single printed circuit provided at the back of the inner plate;

when one of the LEDs fails, repairs are lengthy and expensive insofar as the faulty LED must be located, unsoldered from the printed circuit, and replaced by a new LED; and although the above repair could indeed be performed by replacing the entire printed circuit assembly, such a solution is also expensive and complex, with removal of the printed circuit requiring the light to be almost completely dismantled.

OBJECTS AND SUMMARY OF THE INVENTION

The present invention seeks to mitigate those drawbacks, and to this end it provides a signalling light of the type specified above, further comprising a plurality of elongate printed circuits on which respective pluralities of LEDs are mounted, and wherein the inner plate includes means for mounting said printed circuits parallel to one another.

Certain preferred but optional aspects of the signalling light of the invention are as follows:

the light further includes a base co-operating with the cover to define a cavity of uniform thickness, and the inner plate and the outer plate are received in said cavity;

peripheral assembly means are provided for assembling the inner plate to the outer plate; peripheral assembly means are provided for assembling the outer plate to the base; and said means are preferably snap-fastening means;

peripheral assembly means are provided for assembling the cover on the outer plate;

said assembly means for the printed circuits comprise two webs extending along two opposite edges of said inner plate and in which notches are formed for receiving the opposite ends of said printed circuits;

the LEDs mounted on a common printed circuit are connected together electrically in parallel;

a plurality of printed circuits are connected in series between the terminals of a power supply, with a resistance being connected in series therewith;

for each lighting function, a series-parallel circuit of LEDs is provided;

said cavities of the inner plate, and said optical arrangements of the outer plate are held apart by respective link portions, and the link portions of the inner plate and the link portions of the outer plate present shapes that are complementary;

the link portions of the inner plate and/or of the outer plate include appearance treatment;

the optical arrangements are constituted by Fresnel lenses;

each Fresnel lens comprises concentric arrangements formed on the face of the outer plate that faces the cover; and peripheral sealing means are provided between the cover and the outer plate.

In another aspect, the present invention also provides a signalling light block comprising a plurality of signalling lights as defined above, wherein an inner plate is provided for each signalling light, and wherein a common outer plate is provided for at least two adjacent signalling lights.

Certain preferred aspects of the signalling light block of the invention are as follows:

between the outer plate and the cover, wall-forming means are provided to separate the areas illuminated by each signalling light;

a space is provided between two adjacent signalling lights, wall-forming means are provided between the outer plate and the cover to define a closed cavity between the outer plate and the cover, and catadioptric retro reflection elements are formed on the cover on its face facing the inside of the cavity; and the wall-forming means are made integrally with the outer plate and project outwardly therefrom.

BRIEF DESCRIPTION OF THE DRAWINGS

Other aspects, objects, and advantages of the present invention appear more clearly on reading the following detailed description of a preferred embodiment of the invention, given by way of example and made with reference to the accompanying drawings, in which.

MORE DETAILED DESCRIPTION

As an initial point, it should be observed that from one figure to another, elements or portions that are identical or similar are designated wherever possible by the same reference symbols. It should also be observed that directions such as "front", "back" and the like are used (unless specified otherwise) relative to the general direction in which light is emitted (upwards in FIG. 1 and to the right in FIG. 2).

Figure 1:
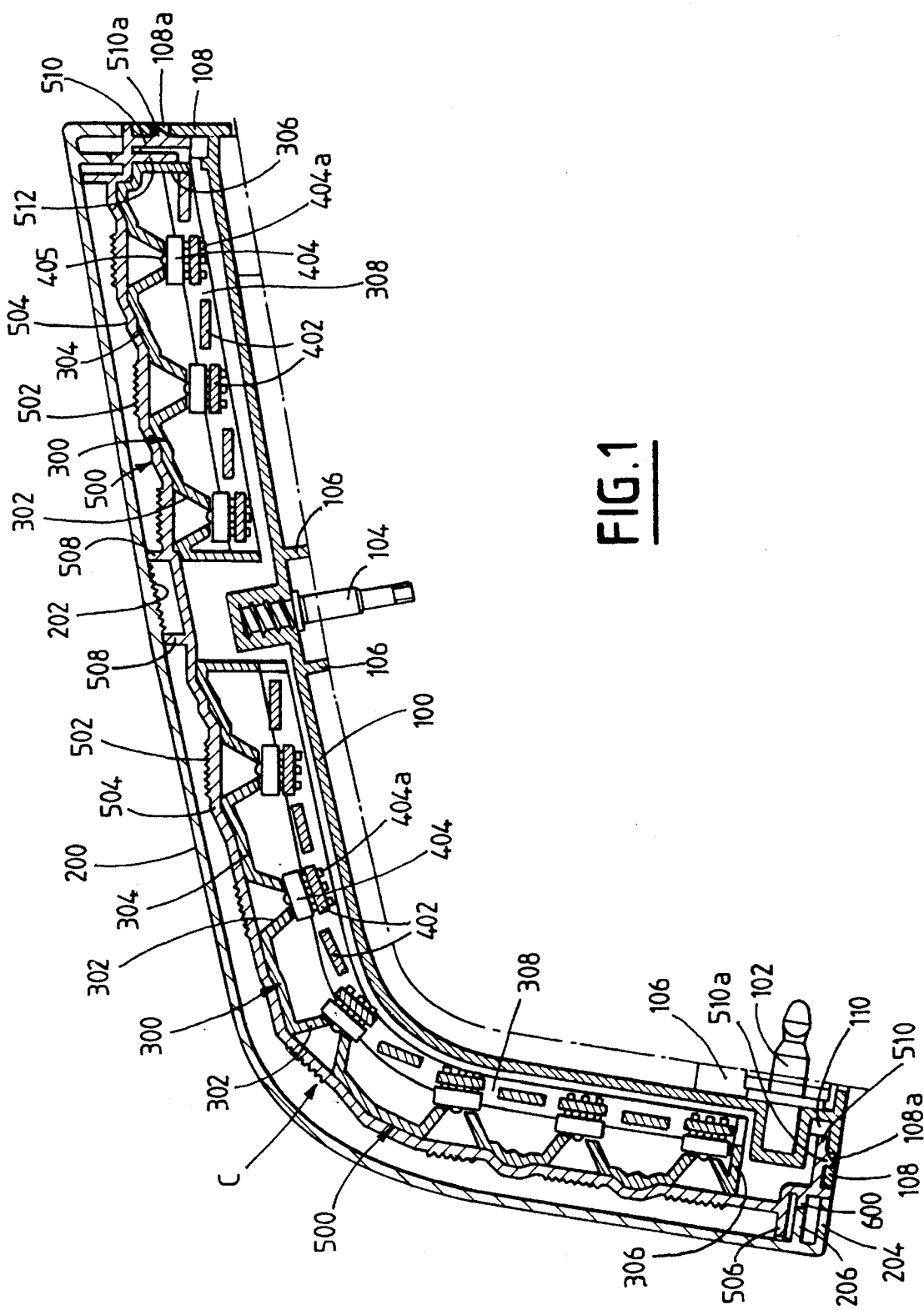
FIG. 1 is a diagrammatic horizontal view through a signalling light block constituting an embodiment of the present invention.
Figure 2:
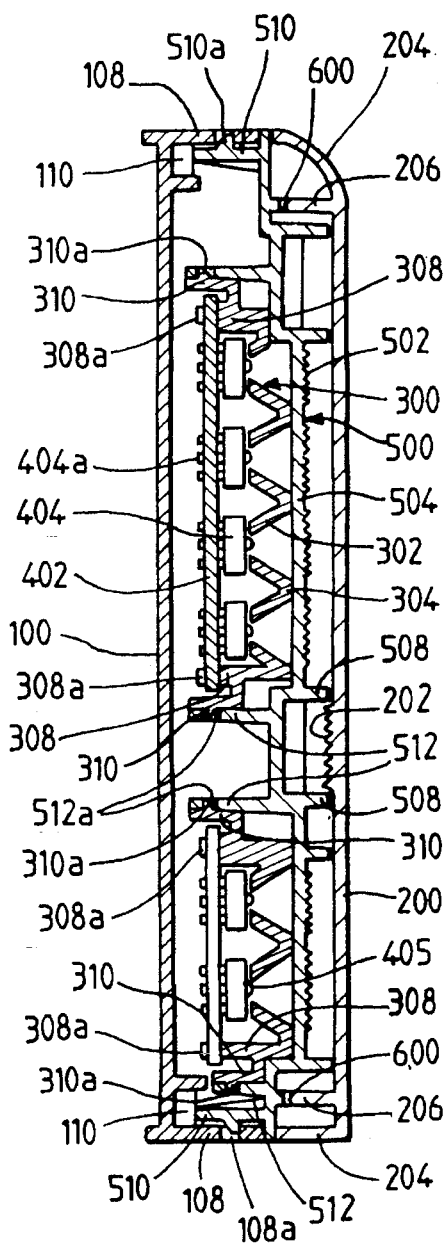
FIG. 2 is a diagrammatic vertical cross-section view through the FIG. 1 signalling block.

With reference initially to FIGS. 1 and 2, there can be seen a signalling light block for the rear end of a motor vehicle and it is conventionally designed to perform a plurality of lighting functions (side-marker light, brake light, turn indicator light, fog light, . . . ) in various specific zones.

The block comprises a base 100 which co-operates with a cover 200 to define an inside cavity C of generally constant and small thickness. As can be seen in particular in FIG. 1, the base 100 and the cover 200 may be curved at will so as to match the shape of the rear corner region of the vehicle (a "corner-hugging light block").

One or more inside plates 300 (four in this case) are disposed inside the cavity C, and in the present case each of them supports a plurality of printed circuits 402 themselves carrying a plurality of light-emitting diodes (LEDs) 404, and having special arrangements over each LED, together with a common outer plate 500 which presents an optical device over each LED.

Each of the above elements is now described in detail.

A first inner plate 300 (to the left in FIG. 1) has a generally rounded shape corresponding to that of the base 100 and of the cover 200 in this region. This plate is made as a single piece by molding a plastics material and it defines a plurality of cavities 302 that taper towards the base. The base end of each cavity 302 has a circular opening whose diameter is slightly greater than the diameter of a hemispherical projection 405 constituting the light-emitting portion of a Brewster type LED 404. Such an LED is used in a manner that is conventional in the field of motor vehicle signalling and comprises a body of generally square outline and of trapezium-shaped axial section, having three rectilinear connection tabs 404a extending in alignment from the face of the body that is opposite to the centrally disposed light emitting portion 405 thereof.

The first inner plate 300 includes generally smooth link portions 304 between the cavities 302, which link portions may optionally be given surface treatment in a manner described in detail below.

A plurality of vertically aligned LEDs are fitted and soldered to a common printed circuit 402 that likewise extends vertically, the inner plate including means for assembling a plurality of such printed circuits side by side, each of them defining a column of LEDs, with the printed circuits being secured via their top and bottom ends in a manner described in detail below.

On each printed circuit 402, it is preferable for the various Brewster LEDs 404 to be electrically connected together in parallel. Naturally, it would also be possible to use a series connection or a series parallel connection. To this end, each printed circuit 402 includes conductive tracks and holes for receiving the tabs 404a which are soldered to said tracks.

As shown in FIGS. 1 and 2, it is preferable to provide one inner plate 300 per lighting function to be performed. In particular, FIG. 1 shows two plates 300 disposed side by side, and FIG. 2 shows two plates 300 disposed one above the other, such that the light block contains four plates 300 in this case.

In contrast, it is preferable to provide an outer plate 500 that is common to all of the lighting functions, said outer plate occupying substantially the same extent as the cover 200. This outer plate comprises, over each tapering cavity 302, optical arrangements designed to concentrate in a determined direction the light flux generated by the corresponding LED. Preferably, each of these arrangements is constituted by a Fresnel lens 502 that is generally coaxial with the cavity 302, comprising a plurality of concentric toroidal or prismatic elements 502a (see FIG. 3). As shown, the Fresnel echelons are preferably located on the outer surface of the plate 500, i.e. its surface adjacent to the cover 200, thereby minimizing the losses of light flux that are conventionally encountered with optical arrangements of this kind when the echelons are situated on the incident light side.

To avoid dust and dirt accumulating on the Fresnel lenses 502, it is necessary to ensure a certain degree of sealing relative to the outside for the space defined between the outer plate 500 and the cover 200. As described in detail below, this sealing may be provided by peripheral welding 600 (mirror welding, ultrasound welding, . . . ) between the facing edges of the outer plate and of the cover. A non-dismountable and well-sealed volume is thus established between the outer plate and the cover, thereby making it possible to avoid dirt accumulating on the Fresnel echelons of the plate 500 and on the beads of the cover, and also preventing dirt accumulating on other optical arrangements such as catadioptric elements, if any.

Between the lenses 502, the outer plate 500 includes generally smooth link portions 504 of a profile that is selected firstly to ensure that the plate 500 follows the shape of the cover while remaining at a certain uniform distance therefrom, and secondly to ensure that said link portions 504 are complementary in shape to corresponding link portions 304 of the inner plate 300, for purposes described below.

Figure 6:
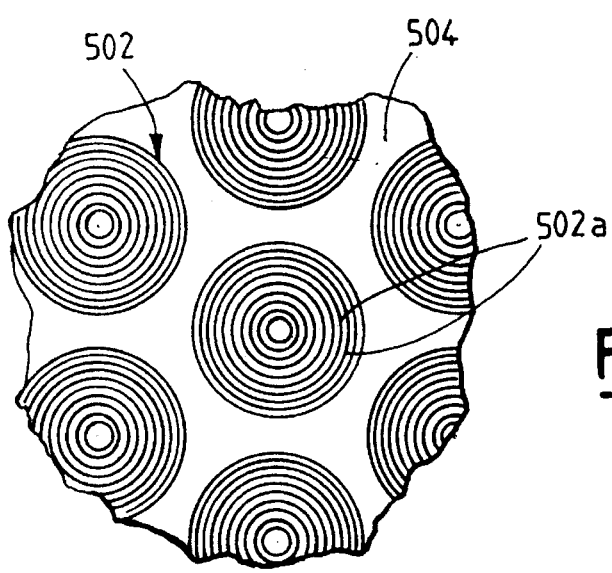
FIG. 6 is a fragmentary face view of an element of the light block of FIGS. 1 and 2.

As shown in particular in FIG. 6, the LEDs 404, the cavities 302, and the Fresnel lenses 502 are disposed in a staggered configuration, with the elements being aligned in vertical columns but being offset alternately upwards and downwards when moving horizontally.

Figure 3:
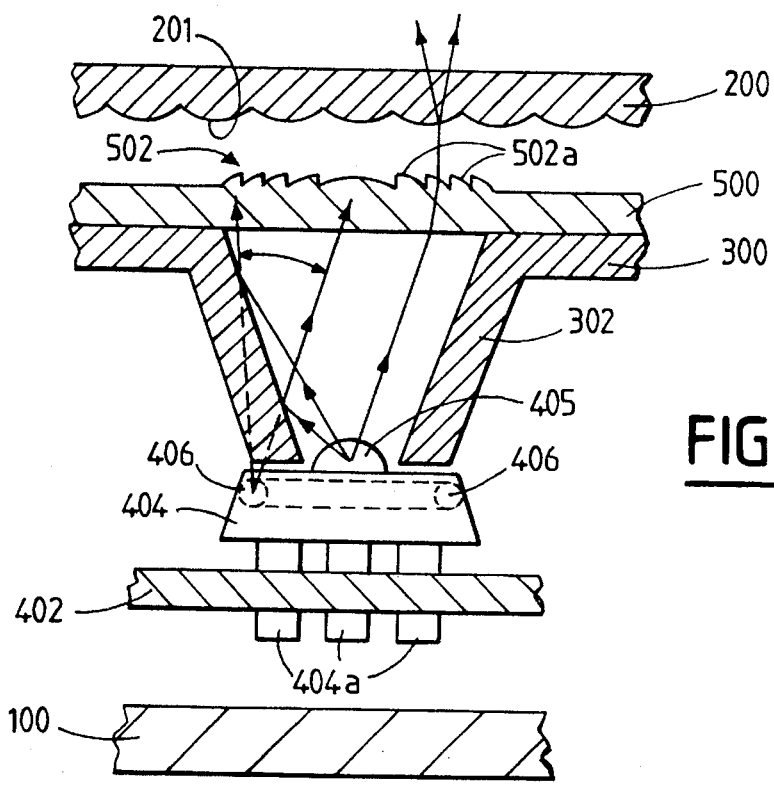
FIG. 3 is an axial section view through a detail of the light block of FIGS. 1 and 2.

Advantageously, the inside face of the cover 200 includes elements for diffusing the incident light flux, e.g. constituted in conventional manner by beads 201 (see FIG. 3).

There now follows a description in detail of the way in which the various elements of the light block co operate with one another in order to ensure mechanical integrity of the block.

The base 100 carries members 102, 104 on its back face for enabling it to be fixed to vehicle bodywork in a manner that is conventional, a bodywork gasket 106 being interposed between said base and said bodywork.

The base also includes, extending forwards close to its periphery, tabs 108 that have openings 108a formed in intermediate regions thereof. In corresponding locations of the periphery of the outer plate 500, the outer plate has tabs 510 that extend backwards over the insides of the tabs 108, and each of the tabs 510 includes a generally triangular snap-fastening catch 510a designed to engage resiliently into the associated opening 108a so as to assemble the plate 500 on the base 100 in releasable manner.

In addition, the plate 500 also includes peripheral reinforcement defined in part by a forwardly-projecting peripheral wall or rib 506 that receives a portion of a peripheral rim of the cover 200. This rim portion comprises an outer skirt 204 and an inner skirt 206 that are both essentially perpendicular to the plane of the cover at its periphery. Welding 600 is performed between the free edge of the inner skirt 206 and the surface of a small rib formed in the reinforcement and in alignment with said skirt 206.

The cover 200 is fixed to the plate 500 and around the outer skirt 204 by adhesive or by welding, for example.

As can be seen clearly in FIG. 2, each inner plate 300 is fixed to the common outer plate 500 by providing tabs 310, in particular in the vicinity of the top and bottom edges of each inner plate 300, which tabs 310 extend towards the back of the light and carry respective laterally projecting snap-fastening catches 310a that are generally triangular in shape. In corresponding regions of the plate 500, there are formed other tabs 512 that likewise extend towards the back of the light and in which openings 512a are provided for the purpose of resiliently receiving the catches 310a.

The catches 310a and the associated openings 512a are positioned in such a manner that the link portions 304 of the plates 300 and the link portions 504 of the plate 500 are positioned substantially against one another, as shown. It will be observed that the corresponding portions 304 and 504 are complementary in shape, thereby making it possible firstly to ensure that the plates 300 and 500 are properly disposed against one another over the entire extent of the light block, and secondly facilitating mutual positioning thereof during snap-fastening of the plates 300 via their edges. It is important for the lenses 502 to occupy positions that are very well defined relative to the corresponding cone and LED assemblies, and in particular it is important for the focus of each lens to be close to the source and for the axis of each lens to coincide with the axis of the cone.

The various printed circuits 402 on which the LEDs 404 have previously been soldered are themselves mounted on the corresponding inner plates 300 by means of arrangements that are now described. In the top and bottom edge regions of each plate 300 there are rearwardly extending webs 308. Each web includes rectangular notches at generally regular intervals shaped to match the section of each printed circuit, each notch being rearwardly opened in the form of a passage defined by two resilient catches 308a. The top and bottom regions of the printed circuits 402 are merely snapped into the notches, going past the catches, and being positioned vertically in such a manner that the projecting portions 405 are engaged in the openings at the ends of the conical portions 302. After assembly, it is this engagement of the portions 405 in the openings at the ends of the conical cavities 302 that ensures that the printed circuits 402 are held in a vertical direction.

In preferred manner, a light block as described above is assembled by performing the following operations in succession:

the Brewster LEDs 404 are soldered to the printed circuits 402;

the printed circuits 402 are installed in the corresponding inner plates 300 by snap-fastening or by welding;

in parallel with the above two operations, the periphery of the outer plate 500 is welded to the periphery of the cover 200;

the various inner plates 300 are assembled to the outer plate 500, again by snap-fastening; and the assembly obtained in this way is mounted on the base 100 by snap-fastening engagement of the plate 500.

With reference more particularly to FIG. 1, it can be seen that the outer plate 500 has forwardly projecting peripheral walls 506 and intermediate walls 508 that are of an extent such as to come into contact with the inside face of the cover 200. To reinforce the fixing of the cover, adhesive or welding may also be provided where they meet.

Another purpose of the walls 508 is to provide good optical separation between the various light-signalling functions provided, by preventing light rays coming from the outer plate 500 spilling over sideways into an adjacent area of lighting.

To this end, the walls 508 are provided with a coating that is opaque or reflective (vacuum deposition of aluminum).

In FIG. 1, it can also be seen that an empty space exists between the lighting areas which correspond to the two inner plates 300. Under such circumstances, the walls 508 are advantageously used to co-operate with the regions of the cover that they delimit and with the regions of the outer plate 500 situated between them to define a space that is generally closed. In said space there are formed catadioptric retro-reflecting trihedrons 202 that are integral with the cover 200. Because of the closed cavity defined in this region by the outer plate 500, the trihedrons are protected from dust and dirt, as is required by regulations.

Advantageously, the portion of the plate 500 overlying the catadioptric region 202 may be provided with a breathing valve or the like (not shown) serving to prevent phenomena associated with the air enclosed in the anti-dust cavity expanding and pressing against the cover 200 or the plate 500 provided with its small walls 508.

The shape of the cones 302 formed in the plate 300 is now described in detail with reference to FIG. 3.

It should firstly be observed that a Brewster LED has a light emission cone that is substantially constant with a half angle at the apex that is generally about 50°.

In accordance with an aspect of the invention, each tapering (i.e. conical) cavity 302 is coated with a reflecting layer (e.g. by aluminum plating) or a layer that is partially reflecting, and the half angle at the apex of each cone 302 is selected to be substantially less than the half angle at the apex of the emission cone, e.g. it may be about 30°. In this manner, the outer portion of the radiation from the LED is reflected on the cone 302 so as to create a virtual light source that is annular in shape and concentric with the common axis of the LED 404 and of the cone 302. This virtual source is referenced 406 in FIG. 3.

By means of this disposition, the light flux entering and also leaving the outer plate 500 is made much more uniform with respect to angular distribution. More precisely, the difference obtained at the inlet face of the outer plate 500 between the lighting on the axis of the cone 302 and the lighting at an angle relative to said axis is attenuated.

Figure 4:
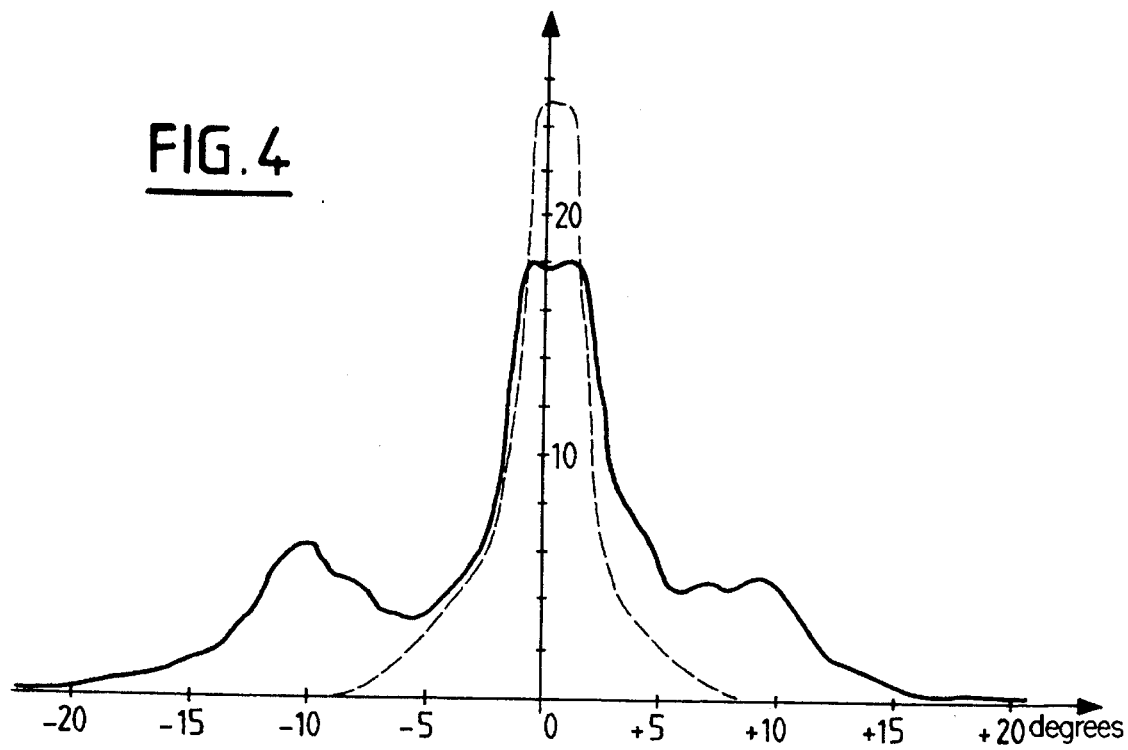
FIG. 4 is a graph showing the distribution of the light obtained from an element of the light block of the present invention.

FIG. 4 is a graph where the solid line curve represents the lighting intensity expressed in candelas as a function of angle, where the angle 0° corresponds to the axis of the cone. There can be seen two lateral "bumps" corresponding to the mean emission angle of the virtual annular source as described above (about ±10°).

For comparison purposes, the graph also shows in dashed lines the lighting that would be obtained by using a Brewster type source and a cone whose angle is close to the emission angle of the source.

It will be understood that with the disposition used, the appearance of the illuminated area when the light is on and while moving past the front of the light remains much more uniform. It will also be understood that the diffusion effect required of the beads 201 is smaller, thereby making it simpler to implement the cover 200.

In a variant, the cones 302 could be replaced by flared dents, e.g. pyramid-shaped dents. Under such circumstances, each of the four plane faces of the dent will define a virtual light source that is generally a point source, and the effect obtained is similar to that described above with reference to a conical dent.

Figure 5A:
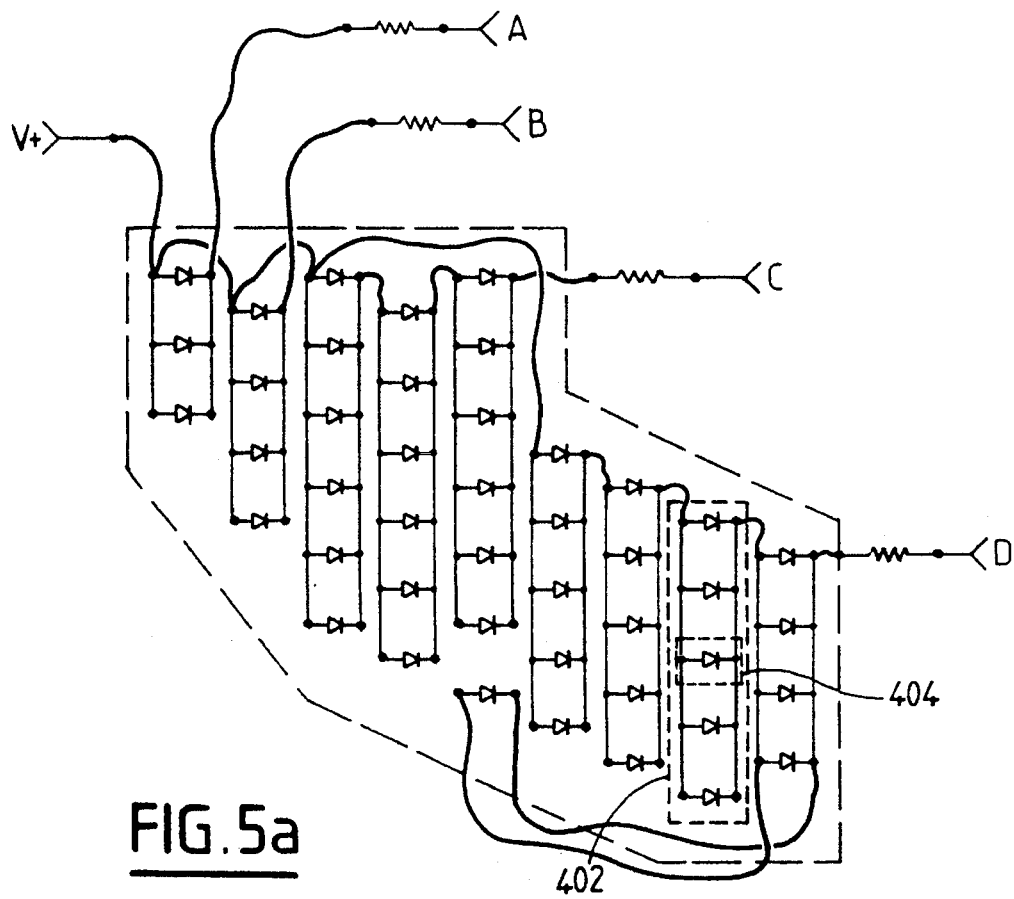
FIGS. 5a and 5b are first and second examples of electrical wiring for the various sources in a signalling light made in accordance with the invention.
Figure 5B:
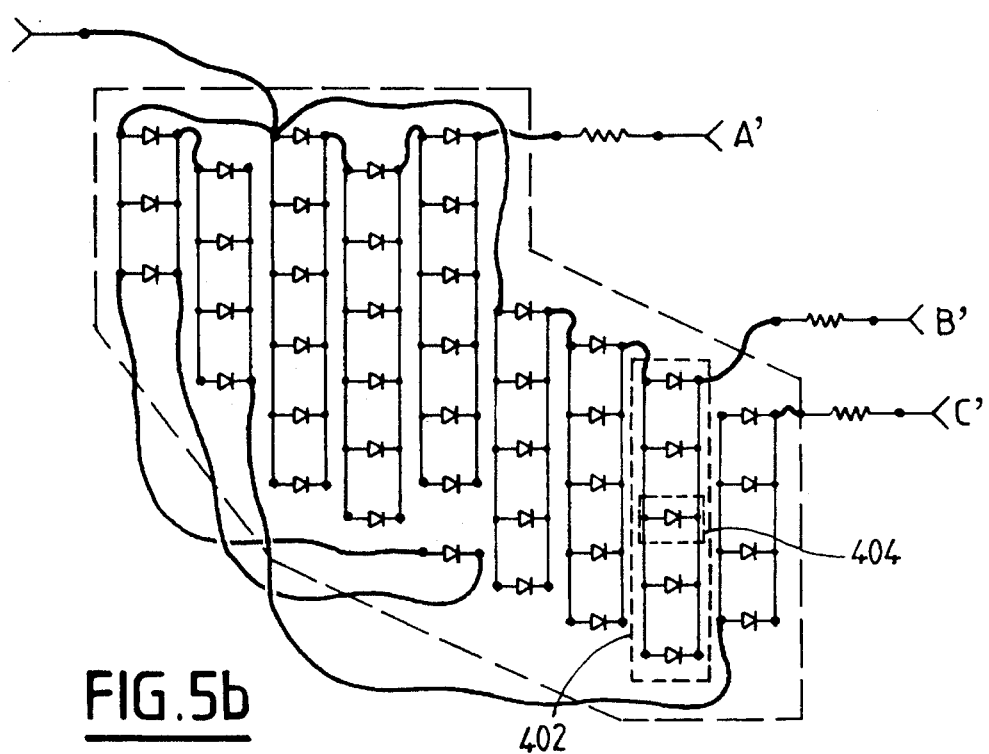

FIGS. 5a and 5b are essentially electrical circuit diagrams showing the various LEDs of one of the signalling lights in a light block implemented in accordance with the present invention. As can be seen, the light-emitting area (dashed outline) is of complex shape, and it is provided with nine vertical printed circuits 402 disposed side by side and respectively containing 3, 4, 6, 6, 7, 5, 5, 5, and 4 LEDs spaced out along columns referenced C1 to C9.

In all of the printed circuits 402 other than that belonging to the column C5, the LEDs are connected together in parallel. In the printed circuit of column C5, the top five LEDs are connected together in parallel whereas the bottom LED is connected separately. The black dots represent wiring terminals of the printed circuits.

In preferred manner, the 45 LEDs of the light are connected to an appropriate power supply using a parallel or a series-parallel circuit.

In the example shown in FIG. 5a, the LEDs of column C1 are connected between a power supply voltage V+ and a point A, with a series resistance Ra being interconnected on that path. The LEDs of the column C2 are connected between the voltage V+ and a point B, with a series resistance Rb being interposed on that path. The parallel-connected LEDs of columns C3 to C5 are connected in series between the voltage V+ and a point C, with an interposed resistance Rc. Finally, the parallel connected LEDs of columns C6 to C9 are connected in series between the voltage V+ and a point D, with a series resistance Rd being interposed on the path. The isolated LED of column C5 is connected in parallel with the LEDs of column C9 by special wiring.

It may be observed that in each branch where combined connection is provided (in this case the last two branches), the number of LEDs in parallel is constant (respectively six and five). In this way, merely by selecting appropriate values for the resistances Ra to Rd, it is possible to obtain constant light-emission from each LED.

The points A, B, C, and D are connected to ground via additional cabling (not shown).

An electrical circuit of the kind described above is advantageous for two reasons. Firstly, if a LED should fail, then the failed LED is the only LED that does not emit light, and the other LEDs in the same parallel connection will indeed emit a slightly increased quantity of light. Thereafter, if a failure should occur in a connecting cable or in a resistance, only the group of LEDs situated in the corresponding branch will be switched off, and the LEDs in the other groups will stay on. In this way, a still significant quantity of light will continue to be produced and adequate signalling for safety purposes will still be provided.

FIG. 5b shows a variant circuit based on the same disposition of printed circuits and diodes.

In this case, the parallel LEDs of columns C1, C2, and C9 are connected in series with a resistance Rc' between V+ and a point C'. By means of appropriate wiring, the isolated LED of column C5 is connected in parallel with those of column C1. In addition, the parallel LEDs of columns C3 to C5 are connected in series with a resistance Ra' between V+ and a point A'. Finally, the parallel LEDs of columns 6, 7, and 8 are connected in series with a resistance Rb' between V+ and a point B'.

The above circuit retains the characteristics and advantages of the circuit of FIG. 5a with respect to uniformity of lighting from the individual sources and behavior when faced with failures.

It may be observed that the resistances may advantageously be implemented as resistors on the printed circuits.

In a variant, the LEDs of a given lighting function may be connected together in a series-parallel circuit.

Normally, the color of a lighting function is determined by the LEDs which are associated with that function (Generally red or amber). Under such conditions, the outer plate 500 and the cover 200 may be made of colorless transparent plastics material.

In a variant, it would nevertheless be possible to color one or both of those elements, providing the wavelengths pass through them are properly matched to the emission spectra of the corresponding LEDs.

It may also be observed that in order to ensure that a light has a uniform appearance when switched off, it is possible to provide arrangements on the link portions of the inner plate 300 or on the outer plate 500 for the purpose of imparting an appearance to the light in those regions that is similar to the appearance of the optical arrangements 502. Such arrangements may be constituted, for example, by aluminum-plating, by roughening, by painting in a neutral color, etc. . . .

Naturally, the present invention is not limited in any way to the embodiment described above and shown in the drawings, and the person skilled in the art will be able to make any variations or modifications thereto in accordance with the spirit thereof.

We claim:

1. A signalling light for a motor vehicle, the light comprising:

a plurality of individual light-emitting diode light sources co-operating with optical arrangements;

a common inner plate having a set of outwardly-flaring cavities and having openings at their small ends through which respective LEDs emit light;

a common outer plate disposed substantially against the outside face of said inner plate and including an optical arrangement over each cavity for processing the light from the corresponding LED; and a closure cover situated outside the outer plate, the light further comprising a plurality of elongate printed circuits on which respective pluralities of LEDs are mounted, and wherein the inner plate includes means for mounting said printed circuits parallel to one another.

2. A signalling light according to claim 1, further including a base co-operating with the cover to define a cavity of uniform thickness, and wherein the inner plate and the outer plate are received in said cavity.

3. A signalling light according to claim 2, wherein peripheral assembly means are provided for assembling the inner plate to the outer plate.

4. A signalling light according to claim 3, wherein peripheral assembly means are provided for assembling the outer plate to the base.

5. A signalling light according to claim 3, wherein the peripheral assembly means comprise resilient snap-fastening means.

6. A signalling light according to claim 4, wherein peripheral assembly means are provided for assembling the cover on the outer plate.

7. A signalling light according to claim 1, wherein said assembly means for the printed circuits comprise two webs extending along two opposite edges of said inner plate and in which notches are formed for receiving the opposite ends of said printed circuits.

8. A signalling light according to claim 1, wherein the LEDs mounted on a common printed circuit are connected together electrically in parallel.

9. A signalling light according to claim 8, wherein a plurality of printed circuits are connected in series between the terminals of a power supply, with a resistance being connected in series therewith.

10. A signalling light according to claim 1, wherein said cavities of the inner plate, and said optical arrangements of the outer plate are held apart by respective link portions, and wherein the link portions of the inner plate and the link portions of the outer plate present shapes that are complementary.

11. A signalling light according to claim 10, wherein the link portions of the inner plate and/or of the outer plate include appearance treatment.

12. A signalling light according to claim 1, wherein the optical arrangements are constituted by Fresnel lenses.

13. A signaling light according to claim 12, wherein each Fresnel lens comprises concentric arrangements formed on the face of the outer plate that faces the cover.

14. A signalling light according to claim 13, wherein peripheral sealing means are provided between the cover and the outer plate.

15. A signalling light block, comprising a plurality of signalling lights according to claim 1, wherein an inner plate is provided for each signalling light, and wherein a common outer plate is provided for at least two adjacent signalling lights.

16. A signalling light block according to claim 15, wherein, between the outer plate and the cover, wall-forming means are provided to separate the areas illuminated by each signalling light.

17. A signalling light block according to claim 15, wherein a space is provided between two adjacent signalling lights, wherein wall-forming means are provided between the outer plate and the cover to define a closed cavity between the outer plate and the cover, and wherein catadioptric retro-reflection elements are formed on the cover on its face facing the inside of the cavity.

18. A signalling light block according to claim 16, wherein the wall-forming means are made integrally with the outer plate and project outwardly therefrom.

* * * * *